Nov. 15, 1955  W. A. LUTZ ET AL  2,723,562
FLOW VELOCITY INDICATING DEVICES
Filed Aug. 13, 1952  4 Sheets-Sheet 1

INVENTORS
William A. Lutz
John D. Maitland
BY William H. Fox
ATTORNEY

Nov. 15, 1955      W. A. LUTZ ET AL      2,723,562

FLOW VELOCITY INDICATING DEVICES

Filed Aug. 13, 1952      4 Sheets-Sheet 3

INVENTORS
William A. Lutz
John D. Maitland
BY William J. Fox
ATTORNEY

United States Patent Office 2,723,562
Patented Nov. 15, 1955

2,723,562

FLOW VELOCITY INDICATING DEVICES

William A. Lutz, Westport, and John Digby Maitland, Wilton, Conn., assignors to Dorr-Oliver Incorporated, a corporation of Delaware Application August 13, 1952, Serial No. 304,166

3 Claims. (Cl. 73—231)

This invention relates to improvements in flow-velocity indicating devices for liquids, where a bladed rotor is placed in the path of the flowing liquid to be rotated thereby, and where the rate of rotation is indicated or registered photoelectrically; that is to say in such devices a path of light or beam is directed from a light source across the path of rotation of the rotor to a light-responsive photoelectric cell, the repetitive rotation of the rotor being indicated or registered from the cell, such indications to serve as criteria of the flow velocity.

It is among the objects of this invention to provide an improved flow velocity indicating device which is exceptionally and highly responsive to produce velocity indications even at flow velocities as low as 1 to 1½ feet per minute.

Other objects are to produce a highly responsive unit where the rotor has a minimum of mechanical or hydraulic drag, and which unit is to be compact, portable in character, and adapted for immersion into a flowing body of water to permit the taking of readings of velocities by indications furnished by the unit with respect to a chosen depth of immersion in that flowing body of water. Examples of flowing bodies of water for the application of this improved unit are streams, open channels carrying slow flowing water or sewage, or continuously operating sedimentation tanks for water or sewage liquid or other liquids, which tanks may have a central feed and peripheral overflow and which may be equipped with rotating sediment mechanism for continually removing the sediment on the tank bottom to a sump or point of discharge. By taking flow velocity readings at various points and depths in such a clarifier tank with such a unit, any flow condition that may be peculiar to the operation of the tank may be examined and determined in this manner in various strata or portions of the liquid body therein.

While the device according to this invention is herein shown by way of example as employed in an environment, providing a substantially horizontally flowing stream, it is also adapted for use in a non-horizontally flowing stream such as may be encountered in a vertical or inclined water or sewage conduit or the like.

These objects are attained by providing such a flow-velocity responsive unit which comprises an open-ended horizontal tubular flow channel or open-ended housing in which is anti-frictionally mounted a rotor or pinwheel of very light weight or of a minimum of mass and having its horizontal axis of rotation coaxial with that of said housing. The rotor is provided with a light-interrupting portion disposed beyond the area of the rotor blades. A pair of light-receiving and light-reflecting prisms with a gap between them are mounted in the wall of the housing to provide between them a short horizontal path of light adapted to be crossed or intersected by the light-interrupting portion passing through the gap between the prisms incident to the rotation of the bladed rotor member. A light source is associated with the one prism and a light-responsive device with the companion prism so as to establish a U-shaped light path from the light source through one prism across the gap to the other prism and thence to the light-responsive device.

According to one feature the prism, the light source and the light responsive device are combined in a water tight auxiliary casing detachably provided upon the tubular flow channel with the prisms sealingly mounted in said auxiliary housing to extend therefrom into cooperative relationship with the light-interrupting portion of the rotor.

According to another feature the light-interrupting portion of the rotor extends from the end of one of the rotor blades; more specifically that portion is in the form of a tab disposed in a plane at right angles to the axis of rotation and hence at an angle to the blade corresponding to the pitch angle thereof.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 1:
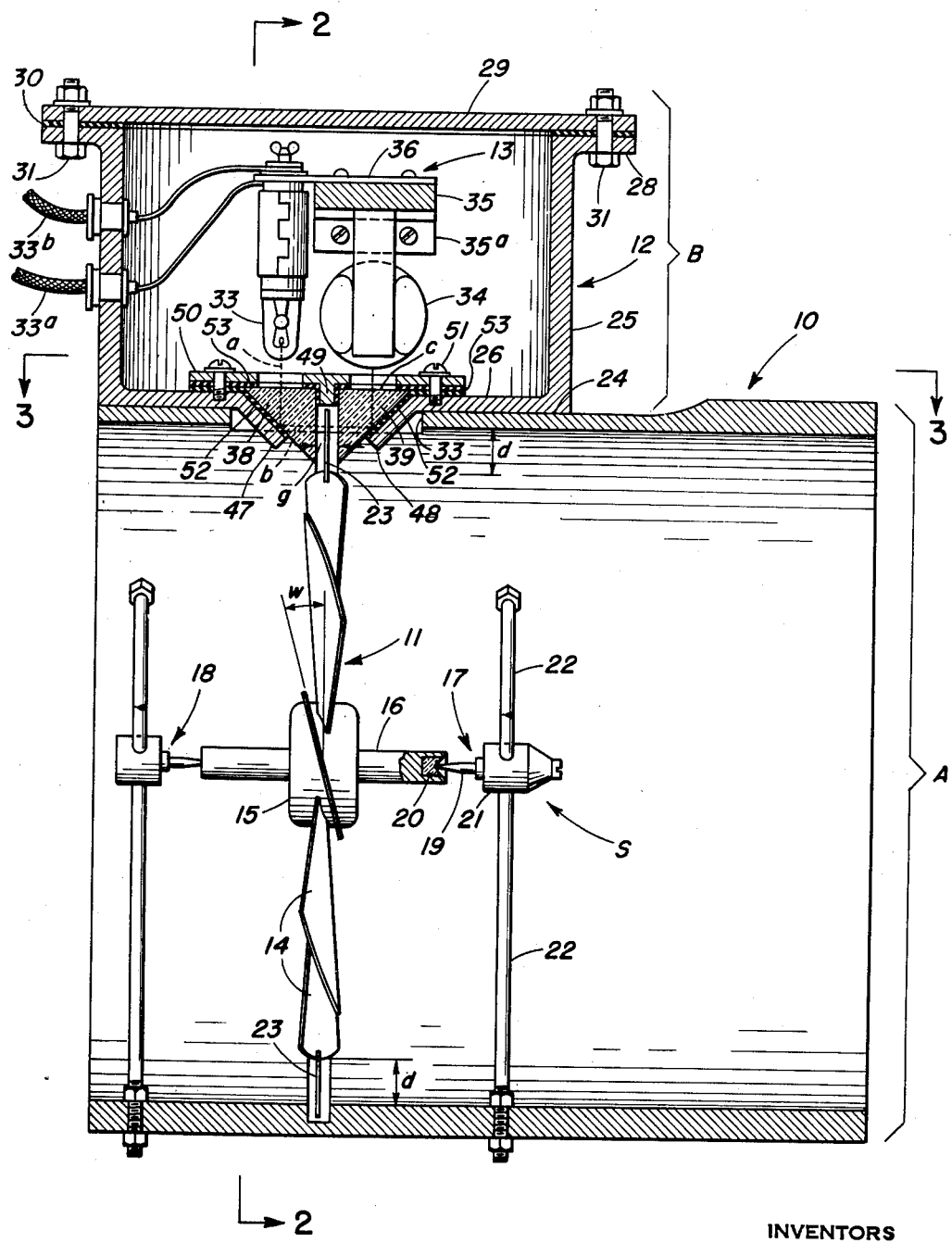
Fig. 1 is a longitudinal sectional view of the device.
Figure 2:
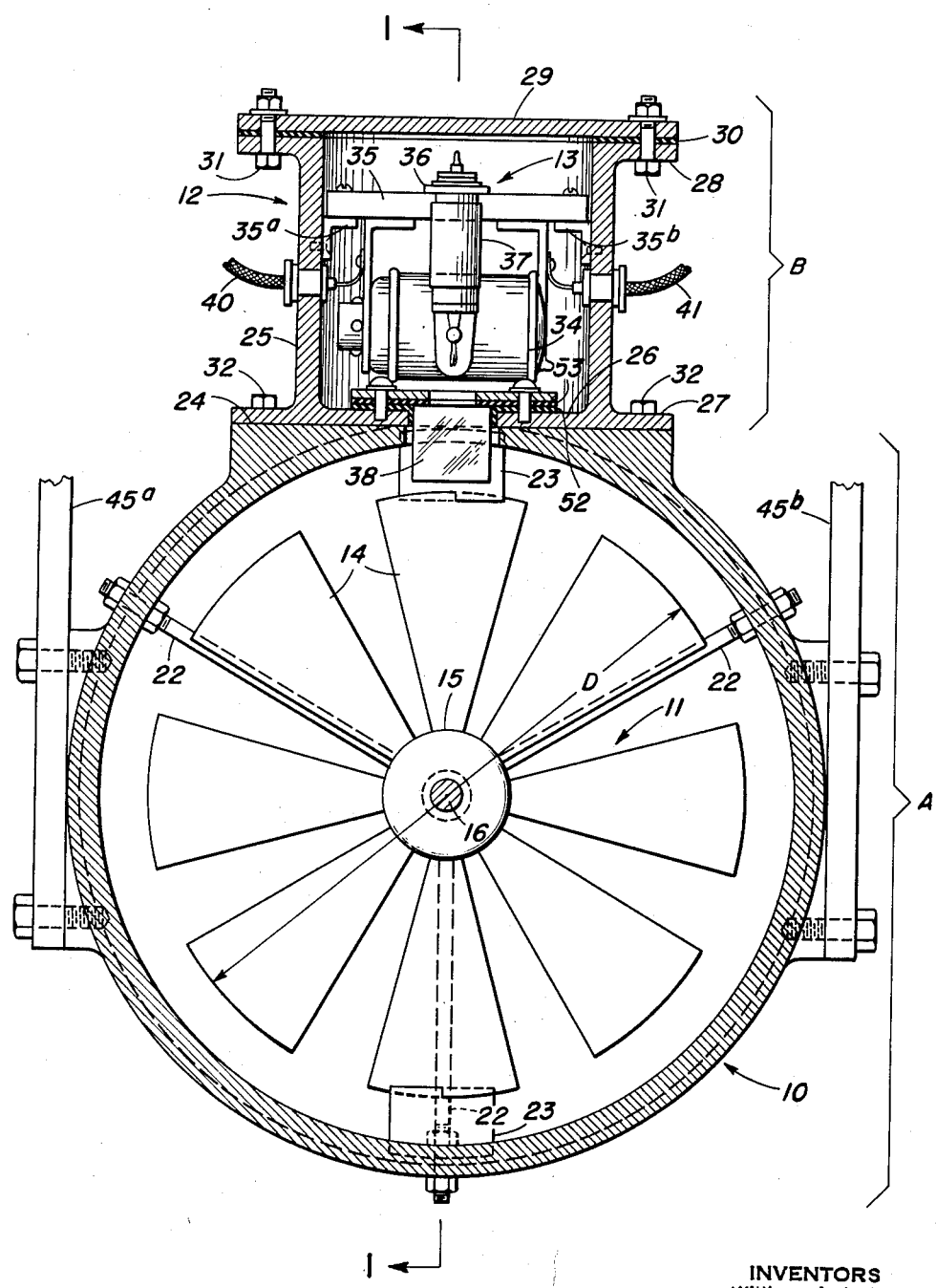
Fig. 2 is a transverse sectional view of the device taken on line 2—2 of Fig. 1.
Figure 3:
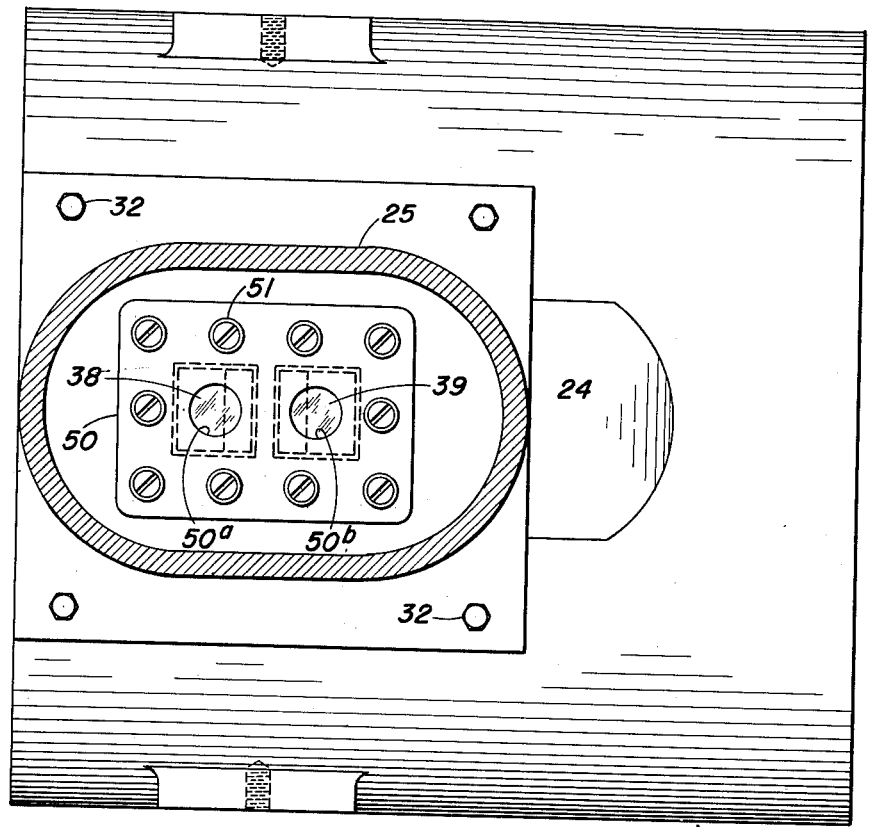
Fig. 3 is a part sectional view taken on line 3—3 of Fig. 1.

As represented in Figures 1, 2 and 3 the velocity indicating device of this invention comprises two main component sections "A" and "B," the section "A" comprising a horizontally open-ended tubular housing 10 which has mounted therein a bladed rotor 11 adapted to be exposed to a stream of liquid passing horizontally through the housing 10, the component section "B" comprising an auxiliary casing 12 attached to the outside of housing 10 and containing a photoelectric device or unit 13 for indicating the number of revolutions per unit of time of the rotor resulting from a stream of liquid passing through the open-ended housing 10.

With respect to component section "A," the rotor 11 therein is mounted for rotation about a horizontal axis which is coaxial with that of housing 10, that is to say the rotor 11 has blade elements 14 fixed upon a hub 15 carried by a shaft 16 which is endwise supported by a pair of pivot bearings 17 and 18, each pivot bearing comprising a horizontal needle-shaped pivot member 19, a jewel bearing insert 20 provided in each respective end of the rotor shaft 16, the needle member being fixedly mounted in the central portion of a spider structure "S" which comprises a central hub 21 having fixedly extending therefrom a plurality of spider legs 22, here shown to be three, the outer ends of which are fixedly connected and anchored in the wall of housing 10; whereas the blade elements 14 are disposed at a suitable pitch angle "w" with respect to the horizontal axis of the rotor or with respect to the plane of movement of the rotor, there is provided upon each of a pair of diametrically opposed blade elements an extension or tab portion 23 extending outwardly from the end of each respective blade element, the tips of the tabs lodging in a peripheral groove provided peripherally and internally in the housing 10. When the rotor 11 revolves, the tab portions 23 move clear of housing 10 while the full area of the rotor as defined by its diameter "D" is exposed to a stream of liquid passing horizontally through the housing 10.

That is to say, there is a clearance "d" between the rotor and the surrounding housing 10 into which clearance probes the photoelectric indicating unit 13 of component section "B" to provide within said clearance a short horizontal light path disposed to be crossed or intersected by the opaque or light interrupting tab portion 23 moving transversely of the path when the rotor turns.

The auxiliary casing 12 is fixedly although detachably mounted upon housing 10 namely upon a flat 24 formed upon the outside of housing 10. The auxiliary casing 12 comprising a box-like body portion 25 somewhat oval in cross-section and formed with a bottom 26, a flange 27 at the bottom, and a flange 28 at the top; and further comprising a cover plate 29 fastened upon the top flange 28 in tightly sealed relationship therewith and as is indicated by a gasket 30 and a set of bolts 31.

The casing 12 is shown to be fastened to the flat 24 of housing 10 as by means of bolts 32, the casing 12 overlying and closing an opening 33 provided in the wall of housing 10.

The photoelectric device 13 in casing 12 comprises an electric light source in the form of electric bulb 33, electric supply connections 33a and 33b for the bulb leading through the wall of casing 12 in sealed relationship therewith, and a light sensitive photoelectric unit or cell 34 shown to be of the cartrideg type, both the bulb and the cell being mounted side by side within the casing 12. The photoelectric cell 34 is shown to be mounted upon the walls of casing 12 by means of a transverse bracket plate 35 and bracket angles 35a and 35b. The bracket plate 35 in turn has mounted thereon an auxiliary bracket plate 36 carrying a socket 37 for the light bulb 33.

The light bulb 33 aims a light beam at the light sensitive unit or photoelectric cell 34 although not directly but by way of a pair of optical prisms 38 and 39 mounted in the bottom of casing 12 and in tightly sealed relationship therewith. The prisms have between them a gap "g" across which a beam of light is adapted to extend horizontally and parallel to the axis of rotor 11 and through which gap pass the light interrupting tab portions 23 when the rotor turns to intersect at right angles with the path of light across gap "g"; that is to say the bulb 33 sends a light beam downwardly along path "a" to the prism 38 which reflects it at 90° into a horizontal path "b" across gap "g" to prism 39 which again reflects at 90° upwardly to the photoelectric cell 34 along a path "c." Whenever the light beam across gap "g" is interrupted by the passage therethrough of tab portions 23, an impulse is sent thereby to a relay device which may comprise a amplifier circuit in connection with a counter mechanism actuated thereby, an example of an electrical wiring diagram for this purpose being shown in Fig. 5. Thus, the revolutions of the rotor 13 in terms of interruptions of the light path across gap "g" are registerable by the counter mechanism. By means of a suitable calibration chart it is then possible to ascertain the velocity of the flowing liquid actuating the rotor 13 in terms of indications of the counter mechanism. The relay amplifier circuit with its counter mechanism constitutes a unit "U" (see Fig. 4) which is wired to the photoelectric device 13 as indicated by connections 40 and 41, and is disposed upwardly remote therefrom and above the liquid level of the body of water or stream in which this velocity indicating device is immersed.

According to one illustration of a practical application of the velocity indicator device (see Fig. 4), the device is positioned in a body of liquid passing through a sedimentation tank 42 having a feed inlet 43 at one end and an outlet 44 for clarified liquid at the other end, the flow of the liquid through the tank being indicated by arrows "R." By way of example, the velocity indicating device here designated as "K" is fixedly attached to a vertical structure 45 (such attachment being indicated also at 45a and 45b in Fig. 2), which vertical structure in turn is carried by and is vertically as well as laterally adjustable upon a transverse structure 46 which is endwise supported by the side walls of the tank and movable or adjustable either forward and backward with respect to the ends of the tank. The relay unit "U" comprising the amplifier relay circuit and the counter mechanism is indicated in Fig. 4 to be mounted upon the emerged or upper end of the vertical structure 45.

The manner of sealingly mounting the prisms 38 and 39 in the bottom 26 of auxiliary casing 12 appears from the views of Figures 1 and 2. The two prisms have their inclined or reflecting faces seated upon a pair of corresponding inclined downwardly converging faces or portions 47 and 48 of bottom portion 26, the vertical faces of the prisms being spaced from each other to constitute the gap "g" as by a rib 49 which is part of a hold-down plate 50 fastened to bottom portion 26 as by screws 51, and having a pair of light passage openings 50a and 50b (see Fig. 3) for the prisms 38 and 39. Water sealing gasket material or rubber lining indicated at 52 and 53 is suitably interposed between the prisms and the parts associated therewith.

Figure 4:
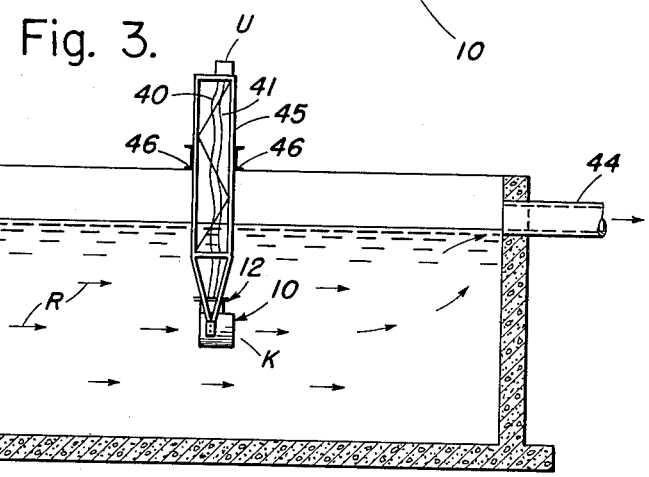
Fig. 4 is an electrical wiring diagram for the device.
Figure 5:
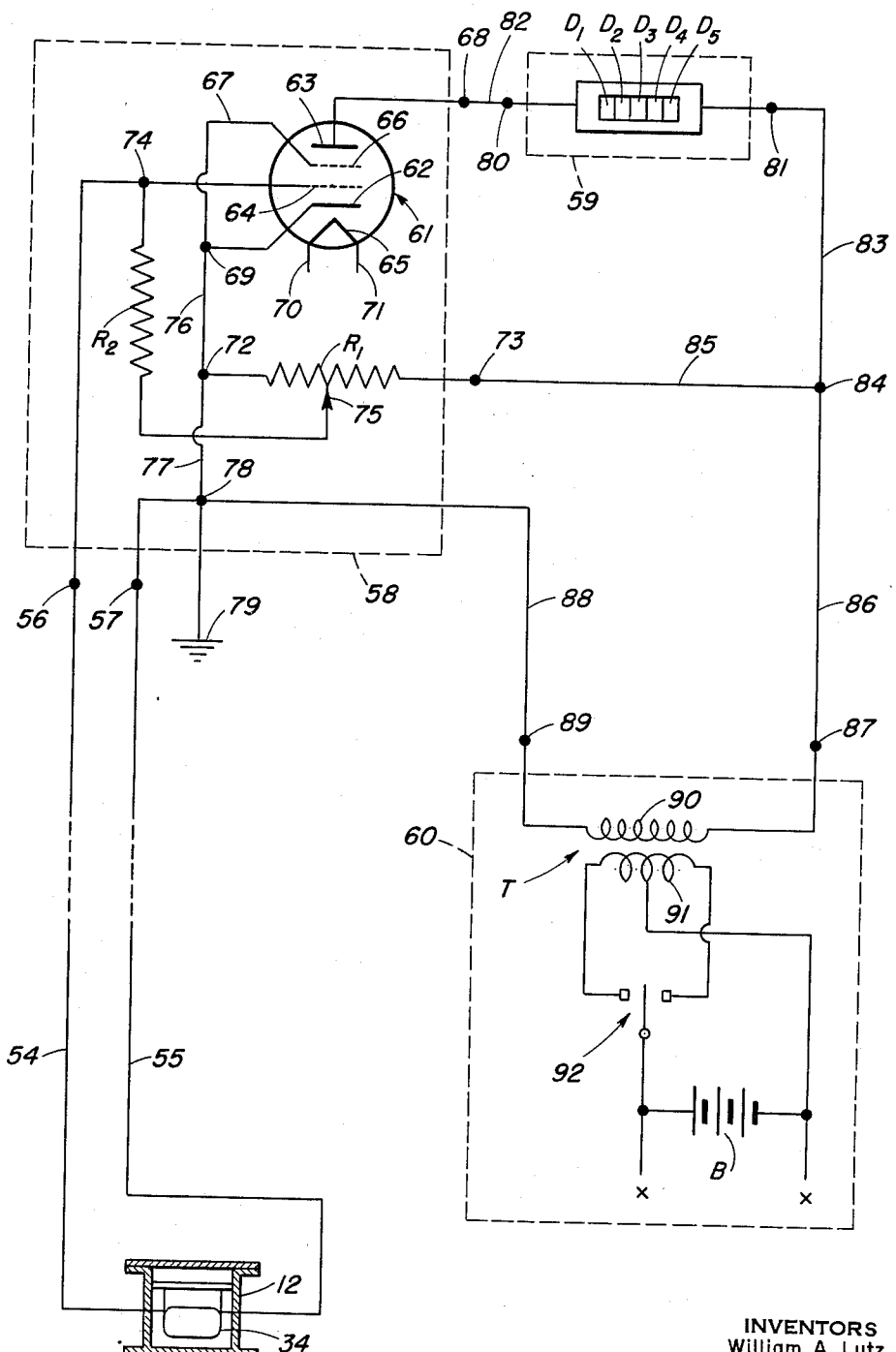
Fig. 5 is a wiring diagram showing the electrical system for registering the flow rates.

The velocity metering device of Figures 1, 2, 3 and 4 may operate by way of the electric wiring diagram shown in Figure 5 which is described as follows:

The photo-electric cell 34 is here indicated diagrammatically together with the auxiliary casing 12 which may be assumed to be in a state of submergence as is indicated by the environment shown in Fig. 4. A pair of waterproof electric conductors 54 and 55 (corresponding to conductors 40 and 41 of Figure 4) lead to the terminals 56 and 57 of an electronic relay unit 58 controlling an electrically actuated counting device 59 diagrammatically shown and indicated to have digit wheels $D_1$. A power supply unit in the form of an inverter unit 60 provides suitable 110 A. C. operating current for the relay unit 58 and the counting device or counter 59 from a 6 volt D. C. storage battery "B."

The electronic relay unit 58 comprises an electronic relay tube such as a gaseous triode or tetrode, or else what is known as a thyratron tube 61 having a cathode 62, an anode or plate 63, a grid 64, and a tube heating element indicated at 65, and also an auxiliary or screening grid 66 connected to cathode 62 as by a conductor 67.

The tube 61 has an anode terminal 68 and a cathode terminal 69 as well as heating terminals 70 and 71. The electronic unit 58 further comprises a variable resistance $R_1$ having terminals 72 and 73, and a fixed or constant resistance $R_2$ having a terminal 74 at one end and a sliding conductor 75 at the other end whereby it is coupled to resistance $R_1$, terminal 74 being identical to terminal 56 of the relay unit 58. Terminal 72 of variable resistance $R_1$ is connected through conductor 76 to terminal 69 of cathode 62, and also connected through conductor 77 to point 78 which has a ground 79, which ground is identical to terminal 57 of relay unit 58.

The counter 59 has terminals 80 and 81, the terminal 80 being connected through conductor 82 to terminal 68 of the anode 63, while terminal 81 is connected through conductor 83 to point 84 which in turn is connected through a conductor 85 to the terminal 73 of resistance $R_1$. The relay unit 58 and the counter unit 59 are in circuit with the inverter unit 60, in that a conductor 86 connects point 84 with a terminal 87 of the inverter unit 60, and a conductor 88 connects the grounded point 78 of the relay unit with another terminal 89 of the inverter unit 60.

The terminals 87 and 89 of the inverter unit in fact represent the terminals of the secondary 90 of a transformer "T" supplying 110 volt A. C. current from the portable storage battery "B." This is to say, the battery current is sent through the primary 91 of the transformer by way of a vibrating switch 92, thereby producing the desired 110 volt A. C. output at the terminals 87 and 89.

In the operation proper, as long as the rotor 11 turns because of water or liquid passing horizontally through the tubular housing 10, as long as light from bulb 33 reaches the photo-electric cell 34 by way of prisms 38 and 39 and across the gap "g" therebetween, the resulting photo-electric current negatively biases the grid 64 with respect to cathode 62. This negative bias chokes the passage of current through the tube and prevents the flow of current from the inverter unit 60 through the tube and through the counter 59 thus leaving the latter inactive and deenergized. However, during the time that the passage of light across the gap "g" is interrupted by the tab 23 passing through the gap, the voltage on grid 64 rises as photo-electric current is reduced or falls to zero, thus allowing 110 volt A. C. operating current from the secondary 90 to pass through the relay tube 61 and therefore also through the counter unit 59 thereby to energize the same and to effect a corresponding advance of a respective digit wheel in that unit. Thus a sequence of passages of the tabs 23 through the gap "g" incident to the turning of the rotor 11 is registered by the digit wheels of the counter unit 58 and can be evaluated in terms of liquid flow velocity through housing 10. This is to say, every time the path of light across gap "g" is interrupted by tab 23, operating relay current is established by way of terminal 87, point 84, conductor 83, terminal 81, counter unit 59, terminal 80, conductor 82, terminal 68, anode 63, cathode 62, terminal 69, conductor 76, and ground 79. As the tab 23 leaves the gap "g," the photo-electric current is restored reimposing the negative bias upon grid 64 and again choking the relay current through the tube.

While the present embodiment shows the flow velocity indicating device disposed with the axis of rotor 11 extending horizontally and thus substantially codirectional with the horizontal flow of liquid through the tank, it is to be understood that the device may be disposed or oriented in any other direction for indicating flow parallel to the axis of the rotor. With the aid of this device velocity measurements can be taken in three directions or at right angles and the results compounded so that the absolute flow velocity of the liquid at any point in a sedimentation tank or any other tank, can be determined by means of this velocity indicating device.

We claim:

1. A flow-velocity indicating device for liquid in which a bladed rotor is rotatably mounted in an open-ended housing, said rotor to be actuated by the flow of fluid through said housing to have its revolutions indicated by means of a light source together with a light responsive device disposed with respect to each other and with respect to said housing as well as with respect to the rotor in such a manner as to indicate the revolutions of the rotor by reason of the repetitive interruptions by a portion of the rotor repetitively crossing the path of light between said light source and said light responsive device; characterized thereby that said rotor comprises a light interrupting tab extending outwardly from the periphery of the rotor, and that a pair of light deflecting prisms with a gap between them is functionally disposed with respect to said light source and said light responsive device in such a manner as to provide a U-shaped light path from the light source through the prisms across said gap to the light responsive device with the intermediate portion across said gap being closed by said light interrupting tab of the rotor, with the addition of a hollow mounting in the form of an auxiliary water tight casing for enclosing therein (a) said light source, (b) said light responsive device, and (c) said prisms sealingly mounted to be water tight in a wall portion of said casing, said auxiliary casing being removably mounted upon said open-ended housing with the outer end portions of said prisms extending through the walls of said casing and of said housing into cooperative relationship with said tab portion of the rotor passing through the gap between said prisms, and means for so removably mounting the said auxiliary casing with respect to said open-ended housing, whereby said housing jointly with said casing is submergible into a body of water for response to the flow velocity therein.

2. A flow velocity indicating device according to claim 1 in which the water tight mounting of the prisms comprises means for seating said prisms in said wall portion of the casing, spacer means determining said gap between said prisms, a removable retaining member for said seated prisms, which retaining member has a light passage opening for each respective prism and is removably fastened to the inside of said casing portion, and sealing means interposed between said prisms and said casing wall portion as well as between said prisms and said spacer means and said retaining member to effect a water tight mounting of said prisms in said casing portion.

3. A flow velocity indicating device according to claim 2, in which said spacer means is unitary with said retaining member.

References Cited in the file of this patent

UNITED STATES PATENTS

| | | |
|---|---|---|
| 1,786,025 | Owens | Dec. 23, 1930 |
| 1,984,630 | Carlson | Dec. 18, 1934 |
| 2,204,463 | Allen | June 11, 1940 |
| 2,557,314 | Robison et al. | June 19, 1951 |
| 2,623,389 | Van Oosterom | Dec. 30, 1952 |

FOREIGN PATENTS

| | | |
|---|---|---|
| 799,156 | France | Mar. 27, 1936 |